United States Patent
Gardner

(10) Patent No.: US 6,735,909 B1
(45) Date of Patent: May 18, 2004

(54) FRAME FOR SLIDE-OUT ROOM FOR MOBILE LIVING QUARTERS

(76) Inventor: Stewart Gardner, 17812 County Rd., Bristol, IN (US) 46507

( * ) Notice: Subject to any disclaimer, the term of this patent is extended or adjusted under 35 U.S.C. 154(b) by 64 days.

(21) Appl. No.: 10/051,717

(22) Filed: Jan. 17, 2002

Related U.S. Application Data

(60) Provisional application No. 60/262,573, filed on Jan. 18, 2001.

(51) Int. Cl.[7] .............................................. E04B 1/346
(52) U.S. Cl. ........................ 52/67; 52/656.1; 296/26.01
(58) Field of Search ............... 52/67, 656.1; 296/26.01, 296/26.12, 26.13, 171, 175; 312/263, 262.5; 40/765, 766

(56) References Cited

U.S. PATENT DOCUMENTS

| | | | | |
|---|---|---|---|---|
| 2,820,666 A | * | 1/1958 | Grochmal .................... | 296/171 |
| 3,169,280 A | * | 2/1965 | Jarman .......................... | 52/67 |
| 5,171,056 A | * | 12/1992 | Faludy et al. ............... | 296/163 |
| 5,237,782 A | * | 8/1993 | Cooper .......................... | 52/67 |
| 5,620,224 A | * | 4/1997 | DiBiagio et al. ........ | 296/26.13 |
| 5,785,373 A | * | 7/1998 | Futrell et al. ............ | 296/26.01 |
| 5,788,306 A | * | 8/1998 | DiBiagio et al. ........ | 296/26.02 |
| 5,971,471 A | * | 10/1999 | Gardner ...................... | 296/165 |
| 6,048,016 A | * | 4/2000 | Futrell et al. ............ | 296/26.13 |
| 6,536,821 B1 | * | 3/2003 | Gardner ................... | 296/26.01 |

* cited by examiner

Primary Examiner—Kimberly Wood
(74) Attorney, Agent, or Firm—Botkin & Hall, LLP

(57) ABSTRACT

A slide-out room assembly for mobile living quarters, such as a recreational vehicle, includes a pair of side walls, a ceiling wall, and a floor wall, all of which are received in corresponding sockets in a frame that extends around the outer edges of the side walls, floor wall and ceiling wall. The frame includes an outwardly extending flange that engages the side wall of the main living quarters when the slide-out room is retracted. The outer wall panel is bonded to the flange by an appropriate adhesive and encloses the end of the slide-out room defined between the ends of the side walls, ceiling wall and floor wall. A raceway is provided in the frame that extends around ends of the side walls, floor wall and ceiling wall to permit the necessary electrical wiring to be routed around the end of the slide-out room.

18 Claims, 6 Drawing Sheets

FRAME FOR SLIDE-OUT ROOM FOR MOBILE LIVING QUARTERS

This application claims domestic priority based upon provisional U.S. patent application Ser. No. 60/262,573, filed Jan. 18, 2001.

TECHNICAL FIELD

This invention relates to a slide-out room for mobile living quarters.

BACKGROUND OF THE INVENTION

Mobile living quarters, including recreational vehicles such as travel trailers and fifth wheel travel trailers and motor homes, are limited in width to that which can be accommodated for travel over public highways. Since consumers demand that such mobile living quarters, when parked for use, provide adequate living accommodations, it has become customary to provide recreational vehicles with "slide-out" rooms that are withdrawn into the main living quarters when the recreational vehicle is moved over public highways, but which slide out to provide additional space when the unit is parked for use. Providing a slide-out room for a recreational vehicle substantially increases the complexity and cost of the unit. Accordingly, it is desirable to simplify construction of slide-out rooms, while also assuring that the slide-out rooms always have the necessary structural rigidity. It is also necessary that slide-out rooms be, as nearly as possible, free of leaks. Since a slide-out room is relatively large and includes one side which is entirely open (so that users can have ready access to the portion of the living quarters defined by the slide-out room when the unit is parked for use), slide-out rooms must be designed to have the necessary structural rigidity, and provisions must be made so that leaks are avoided.

SUMMARY OF THE INVENTION

According to the present invention, a slide-out room for mobile living quarters includes an outer wall consisting of a frame including a channel portion that extends around the side walls, ceiling and floor of the slide-out room. The frame includes an outer flange that extends outwardly from the channel portion over the adjacent portions of the wall of the main living quarters which define the aperture through which the slide-out room extends and retracts. An outer wall panel is secured to the flange by an appropriate adhesive. The channel portion also includes an inner flange which extends parallel to the outer flange onto which an inner wall panel member is secured by an appropriate adhesive. The channel portion of the frame and the inner and outer panels define a cavity therebetween which receives appropriate insulating material. The channel member also defines a socket that extends around the outer wall and that receives the side walls, the floor, and the ceiling of the slide-out room, thereby forming a rigid structure which permits walls, ceiling and floor of the slide-out room to be easily assembled. A drip rail extends along the portion of the frame which receives the ceiling to deflect any moisture which may leak through the outer flange away from the walls of the slide-out room. The channel portion of the frame includes a raceway conduit which circumscribes the outer wall that permits easy routing of the necessary electrical connections.

DETAILED DESCRIPTION OF THE DRAWINGS

Figure 1:
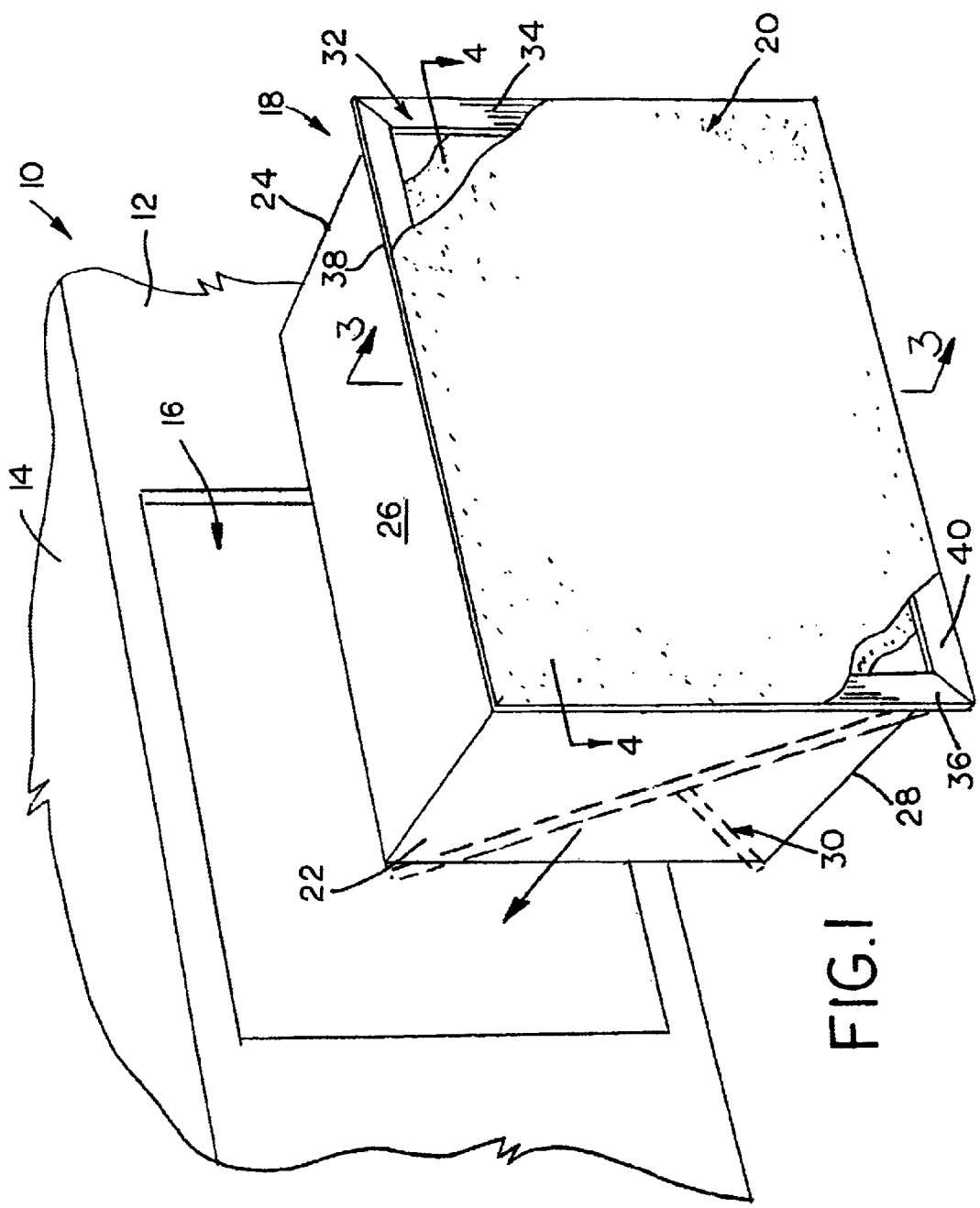
FIG. 1 is a fragmentary view in perspective of a slide-out room according to the teachings of the present invention and an adjacent portion of the mobile living quarters upon which the slide-out room is used.
Figure 2:
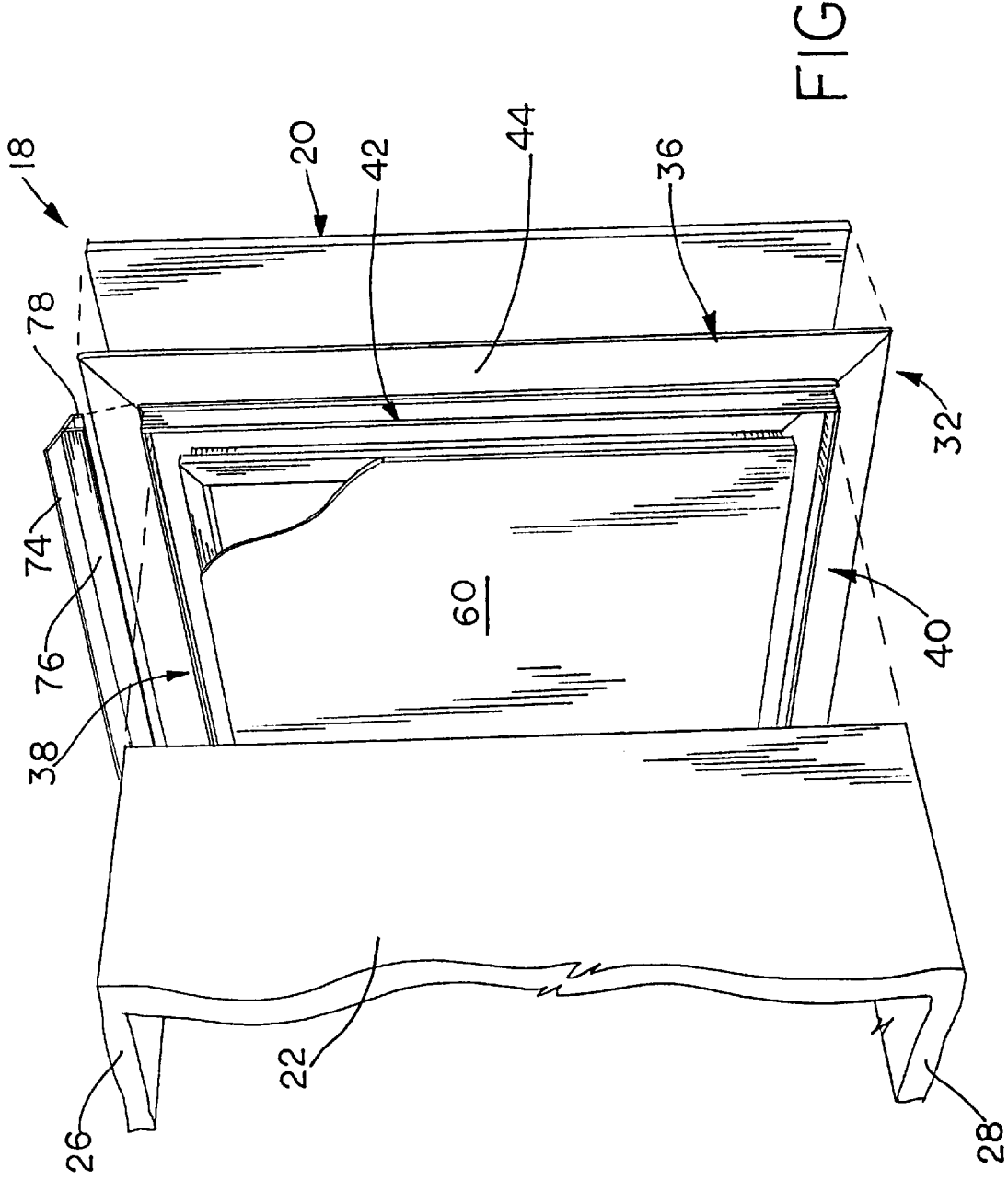
FIG. 2 is a fragmentary exploded view in perspective of a portion of the front wall, one side wall, the ceiling and the floor of the slide-out room illustrated in FIG. 1.

Referring now to the drawings, a mobile living quarters is generally indicated by the numeral 10 and includes a side wall 12 and a roof 14. An aperture 16 has been provided in the side wall 12 through which a slide-out room generally indicated by the numeral 18 extends and retracts. Slide-out room 18 includes an outer panel assembly generally indicated by the numeral 20, a pair of side wall panels 22, 24, a ceiling panel 26, and a floor panel 28. The slide-out room 18 is supported for movement relative to the aperture 16 by a linkage mechanism generally indicated by the numeral 30 which is shown in phantom in FIG. 1, but which forms no part of the present invention.

The outer panel member 20 is mounted on a frame generally indicated by the numeral 32.

Frame 32 includes side edge portions 34, 36 which are connected by a top edge portion 38 and a bottom edge portion 40. The portions 34–40 of the frame 32 may be formed in any convenient way, such as by extrusion, the extrusion being cut into the portions 34–40 and then assembled as the frame 32. Each of the portions 34–40 of the frame 32 include a channel portion 42 and a flange 44 that projects outwardly from the channel portion 42. The channel portion 42 is defined by an outer edge 46, an inner edge 48, an inner side edge 50, an outer side edge 52 which extends parallel to the inner side edge 50 and which extends into the outwardly extending flange 44. The outer edge 46 is offset from the edge 54 of the aperture 16 by a distance sufficient to allow the slide-out room frame 32 to retract into the aperture 16 a distance sufficient to permit the flange 44, which is of sufficient length to project over the edge 54, to come into contact with the portion of the wall 12 of the mobile living quarters extending around the aperture 16. The flange 44 may include a resilient sealant material 56 secured thereto which contacts the wall 12 when the slide-out room is fully retracted.

Figure 4:
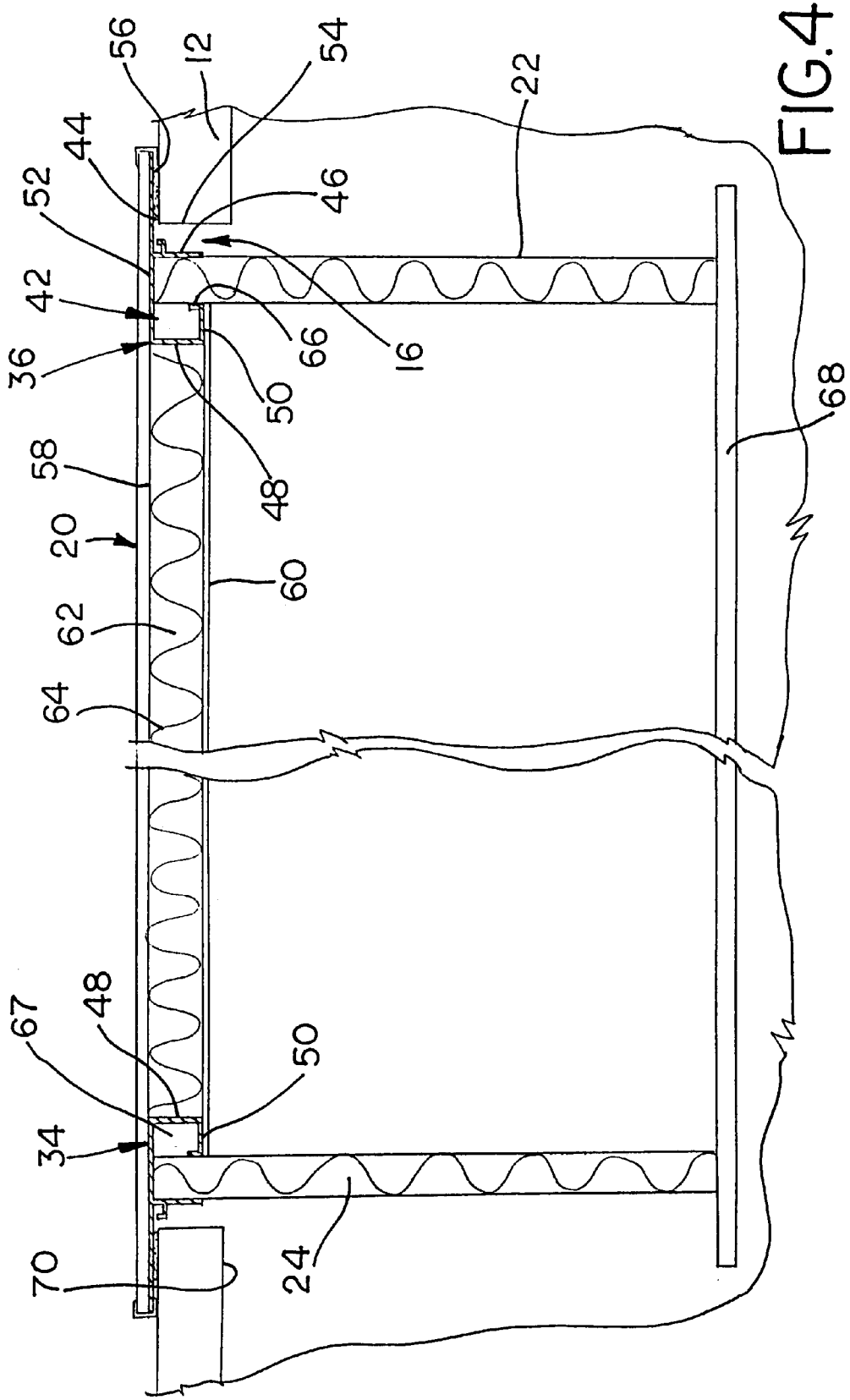
FIG. 4 is a fragmentary cross-sectional view taken substantially along lines 4—4, but illustrating the slide-out room in its position when fully retracted into the main living quarters.
Figure 5:
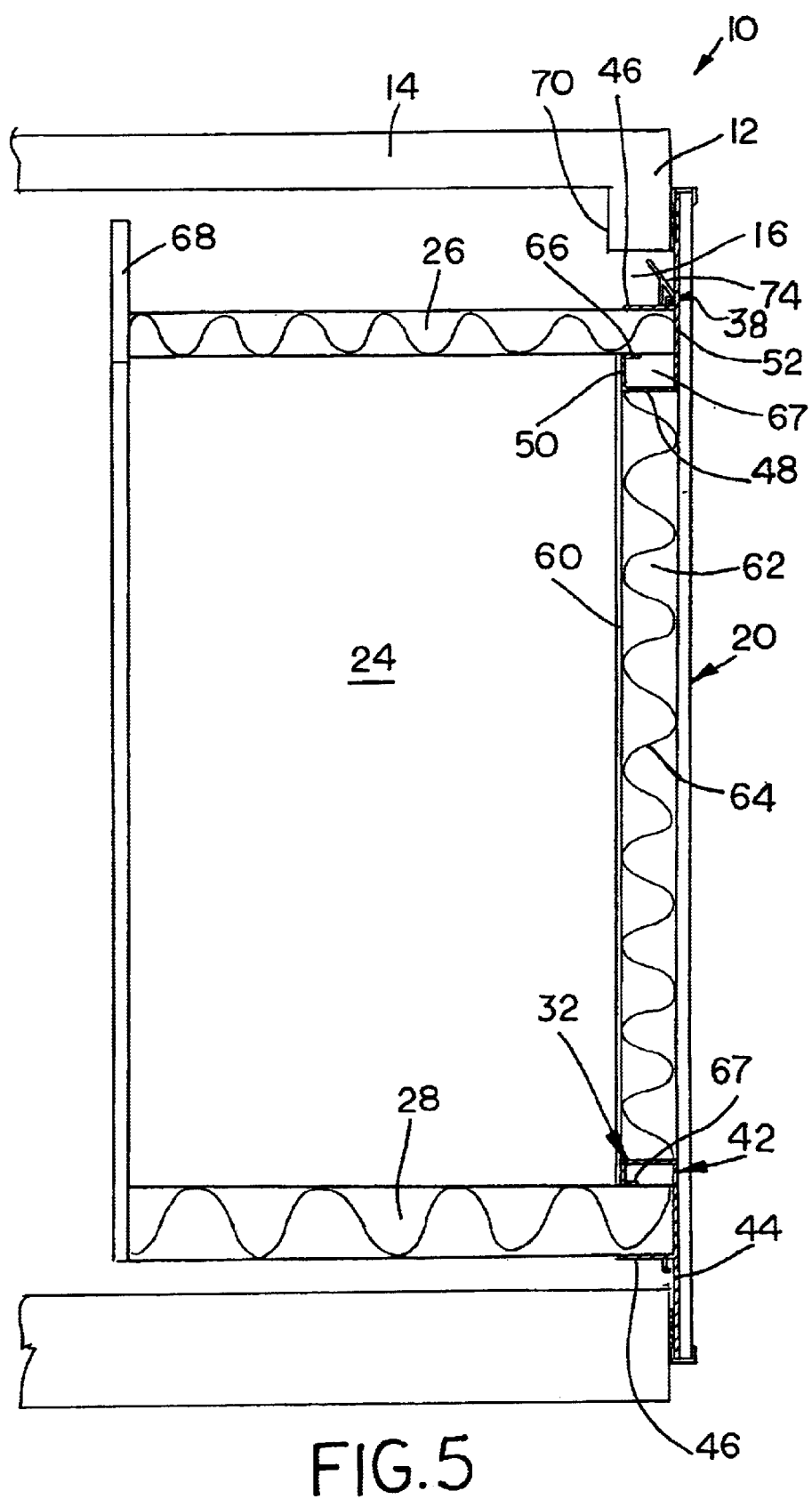
FIG. 5 is a fragmentary cross-sectional view taken substantially along lines 5—5 of FIG. 3.
Figure 6:
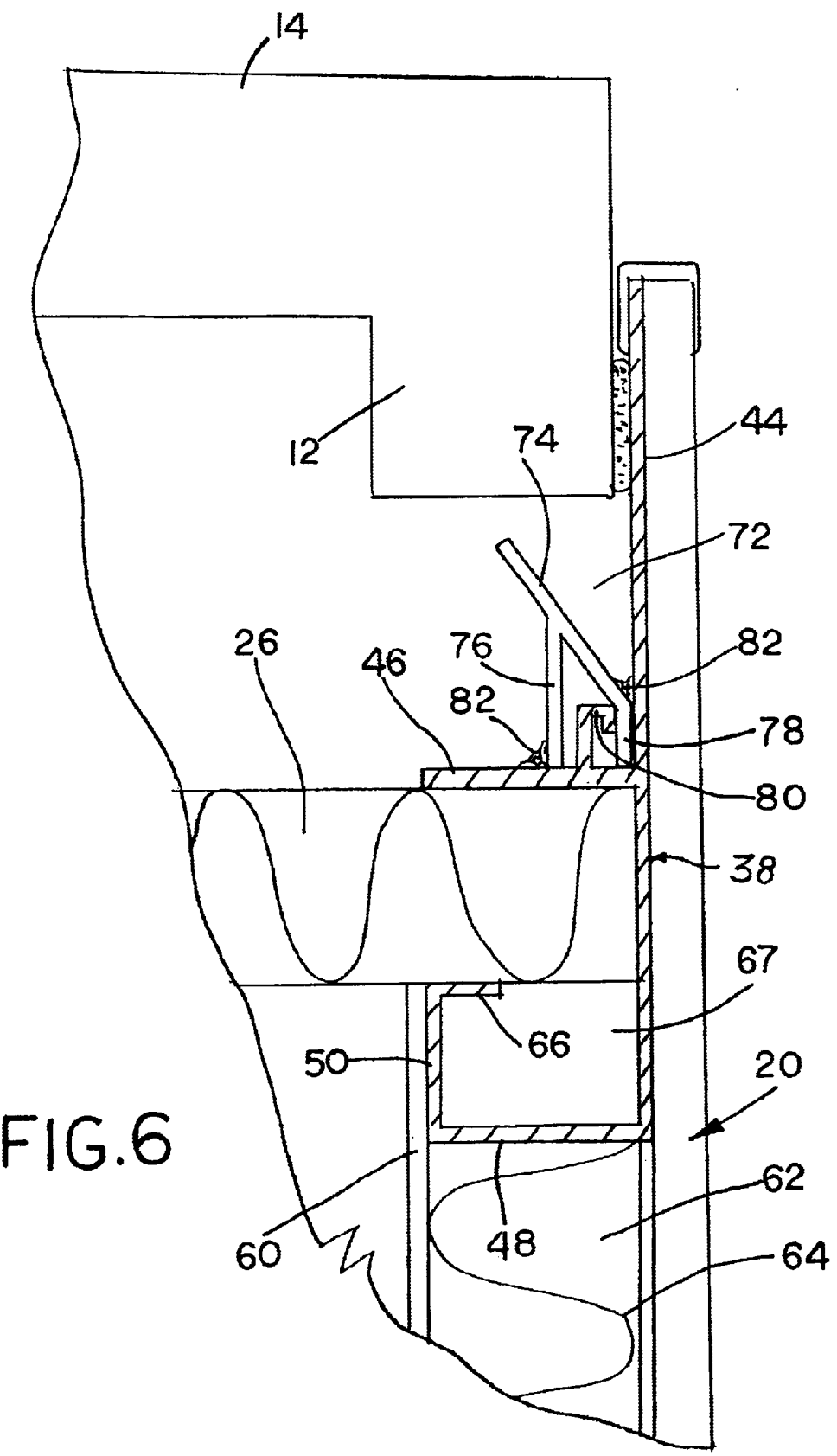
FIG. 6 is an enlarged, fragmentary, detail view of the portion of the upper edge portion of the slide-out room extending with the slide-out room being shown as fully retracted within the main living quarters.

The outer panel assembly 20 further includes an outer panel member generally indicated by the numeral 58 which is of substantially the same dimensions so as to conform to the outer edges of the flange 44. Outer panel 58 may be of any construction typical of recreational vehicles, such as fiberglass or ABS plastic, mounted on a plywood backing. Outer panel 58 is laminated to the flange 44 and side edge 52 by using an appropriate adhesive. The outer wall panel 58 forms the outer side of the slide-out room. An inner wall panel 60 is secured to the side edges 50 of the frame 32 by an appropriate adhesive and defines the interior front wall of the slide-out room 18. A cavity 62 is defined between the outer wall panel 58 and the inner wall panel 60 and by the inner edges 48 of the frame 32. The cavity 62 is preferably filled with an appropriate insulation, such as the conventional honeycomb insulation indicated at 64. As can best be seen in FIG. 4, the side edges 50 of the frame 32 terminate short of their corresponding outer edges 46 at an inturned portion 66. Accordingly, inturned portion 66 cooperates with the outer edge 46 to define a longitudinally extending slot that receives a corresponding side panel 22, 24, ceiling panel 26 or floor panel 28. For example, the slot in the side edge panel 34 receives the side panel 24, the slot in the side edge portion 36 receives the side panel 22, the slot in the top edge portion of frame 32 receives the ceiling panel 26, and the slot in the bottom edge portion 40 receives floor panel 28. Each of the side panels and ceiling and floor panel are secured in their corresponding slots in any appropriate manner, such as by adhesive or fasteners. A decorative trim piece generally indicated by the numeral 68 is mounted on the ends of the side panel members 22, 24 and the ceiling panel member 26 opposite the ends thereof that are received within the slots in the frame 32 as discussed above. The decorative trim piece 68 is also functional in that it engages the inner surface 70 of the wall 12 of mobile living quarters 10 when the slide-out room is in the fully extended position, to thereby close the gaps between the side wall panels 22, 24 and the wall 12 and between the ceiling panel 26 and the wall 12. A raceway 67 is defined between the edges 48, 50 and 52 and inturned portion 66 of each of the edge portions 34–40 of the frame 32. Accordingly, a continuous channel is provided that extends completely and uninterruptedly around the edges of inner wall panel 60. The raceway 67 provides a routing for connections, such as electrical wiring necessary to provide connections to fixtures, such as receptacles, switches, etc. in the panels 20–26 of the slide-our room 18.

Figure 3:
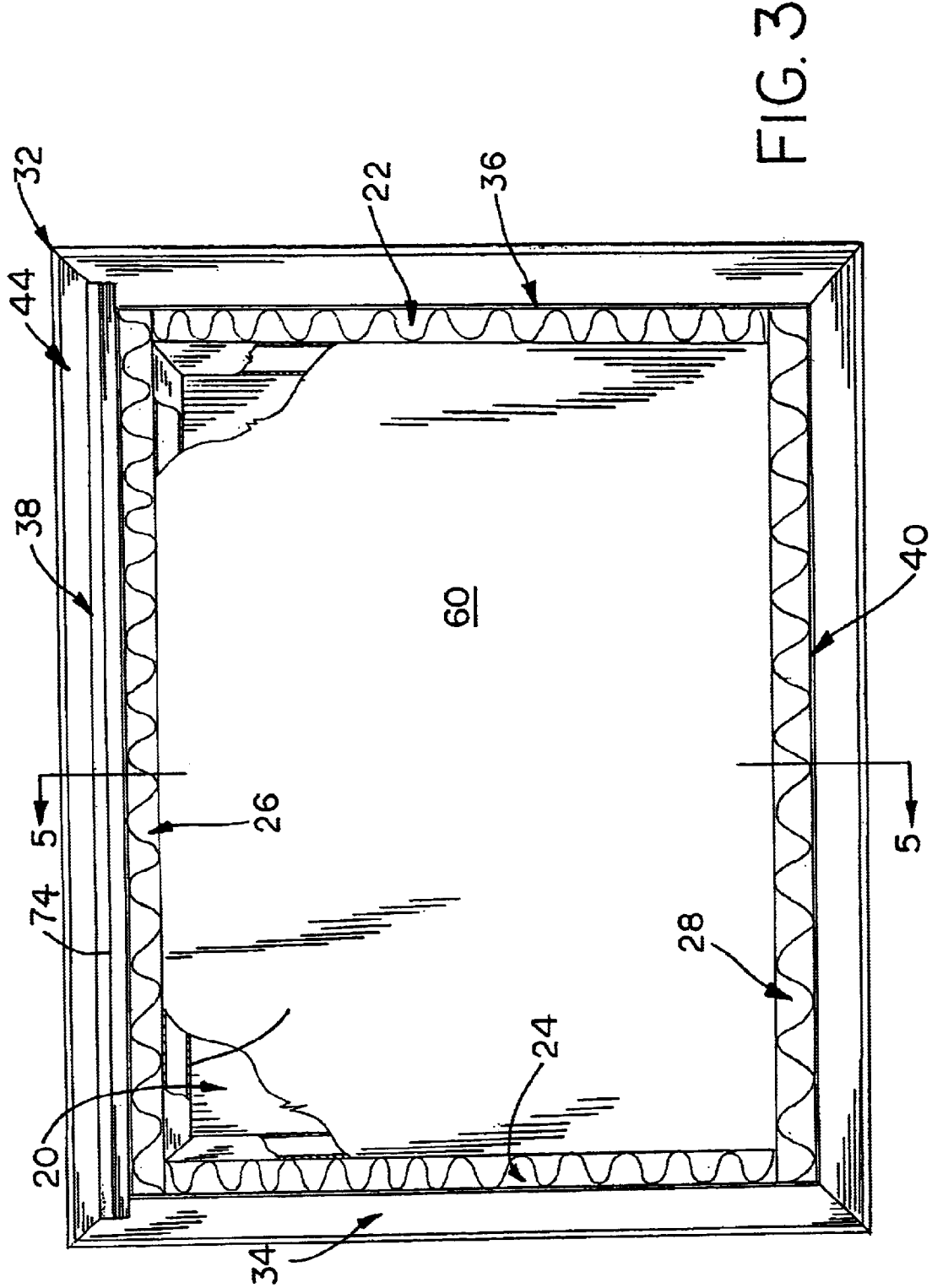
FIG. 3 is a view, partly in section, taken substantially along lines 3—3 of FIG. 1.

To prevent rain from entering the main living quarters when the slide-out room 18 is fully retracted, a drip channel generally indicated by the numeral 72 is provided along outer edge 46 of top edge portion 38. Drip channel 72 is defined between the flange 44 and an angled arm 74 and legs 76, 78 which extend from the angled arm 74. As is shown in FIG. 3, the angled arm 74 extends past the outer edges 46 of the side edge portions 34, 36 so that moisture is able to run off the end of channel 72 and drop to the ground. Leg 78 is captured between the flange 44 and a longitudinally extending projection 80 which extends outwardly from outer edge 46. Appropriate sealing is provided and indicated at 82. Accordingly, rain leaking through interface between the flange 40 and the side wall 12 is collected in channel 72, and is eventually transferred to the sides of the frame, where the moisture falls to the ground.

What is claimed is:

1. Slide out room assembly for mobile living quarters, said mobile living quarters having an outer wall defining an aperture in the outer wall through which the slide out room assembly is extended and retracted, said slide out room assembly comprising an outer wall panel assembly, a pair of side wall panels, a ceiling panel, and a floor panel, said outer wall panel assembly including a frame extending around the outer wall panel assembly, said frame including a channel portion and an outer flange projecting outwardly from said channel portion, said channel portion defining a slot extending around said outer wall panel assembly receiving corresponding end portions of said ceiling panel, said floor panel, and said side wall panels, and an outer wall panel secured to a mounting surface on said channel portion.

2. Slide out room assembly as claimed in claim 1, wherein said frame defines a raceway extending parallel to said slot for routing connections for fixtures carried by the slide out room.

3. Slide out room as claimed in claim 1, wherein a drip channel extends along said frame parallel to that portion of the slot receiving said ceiling panel, said drip channel collecting moisture and deflecting said moisture away from said frame.

4. Slide out room as claimed in claim 3, wherein said drip channel includes an angled arm diverging from said outer flange and extending along an outer edge of the section of the channel portion receiving said ceiling.

5. Slide out room as claimed in claim 4, wherein said angled arm is captured between said flange and a projection extending along said outer edge.

6. Slide out room as claimed in claim 1, wherein said channel portion includes an outer side edge extending perimetrically around said channel portion and an inner side edge offset from said outer side edge and extending parallel thereto, an outer panel member secured to said outer side edge and an inner panel member secured to said inner side edge, said panel members extending parallel to one another and defining a cavity therebetween.

7. Slide out room as claimed in claim 6, wherein said channel portion includes an inner edge extending perimetrically around said cavity and defining the side edges thereof.

8. Slide out room as claimed in claim 7, wherein said channel portion includes an outer edge extending parallel to said inner edge and offset outwardly therefrom, said flange extending outwardly from said outer side edge across said outer edge.

9. Slide out room as claimed in claim 7, wherein said channel portion includes an outer edge extending parallel to said inner edge and offset outwardly therefrom, said inner side edge extending toward said outer edge from said inner edge but terminating in an end surface offset from said outer edge to define a gap therebetween, said gap defining an open edge of said slot receiving said panels.

10. Slide out room room as claimed in claim 9, wherein said inner side edge terminates in an inturned portion extending toward said outer side edge, said inturned portion, said inner edge, said outer side edge, and said inner side edge defining a raceway extending parallel to said slot for routing connections for fixtures carried by the slide out room.

11. Slide out room assembly for mobile living quarters, said mobile living quarters having an outer wall defining an aperture in the outer wall through which the slide out room assembly is extended and retracted, said slide out room assembly comprising an outer wall panel assembly, a pair of side wall panels, a ceiling panel, and a floor panel, said outer wall panel assembly including a frame extending around the outer wall panel assembly, said frame including a channel portion and an outer flange projecting outwardly from said channel portion, and an outer wall panel secured to said flange, said channel portion defining a slot extending around the outer wall panel assembly receiving corresponding end portions of said ceiling, said floor, and said side walls, said channel portion including a perimetrically extending inner flange extending parallel to said outer flange, and a transverse surface connecting said inner and outer flanges and defining a cavity covered by said outer wall panel, and an inner wall panel mounted on said inner flange and extending parallel to said outer wall.

12. Frame for supporting side wall panels, an outer wall panel, a ceiling panel and a floor panel of a slide out room assembly for mobile living quarters, said frame including a channel portion and a flange extending outwardly from said channel portion, said channel portion including an outer mounting surface for supporting said outer wall panel, and a slot extending around said frame for receiving said side wall panels, said ceiling panel, and said floor panel.

13. Frame as claimed in claim 12, wherein said channel portion includes an outer side edge extending perimetrically around said channel portion and an inner side edge offset from said outer side edge and extending parallel thereto, an outer panel member secured to said outer side edge and an inner panel member secured to said inner side edge, said panel members extending parallel to one another and defining a cavity therebetween.

14. Frame as claimed in claim 13, wherein said channel portion includes an inner edge extending perimetrically around said cavity and defining the side edges thereof.

15. Frame as claimed in claim 14, wherein said channel portion includes an outer edge extending parallel to said inner edge and offset outwardly therefrom, said flange extending outwardly from said outer side edge across said outer edge.

16. Frame as claimed in claim 14, wherein said channel portion includes an outer edge extending parallel to said inner edge and offset outwardly therefrom, said inner side edge extending toward said outer edge from said inner edge but terminating in an end surface offset from said outer edge to define a gap therebetween, said gap defining an open end of said slot receiving said panels.

17. Frame as claimed in claim 16, wherein said inner side edge terminates in an inturned portion extending toward said outer side edge, said inturned portion, said inner edge, said outer side edge, and said inner side edge defining a raceway extending parallel to said slot for routing connections for fixtures carried by the slide out room.

18. Frame as claimed in claim 12, wherein said frame defines a raceway extending parallel to said slot for routing connections for fixtures carried by said panels.

* * * * *